United States Patent [19]

Renzi et al.

[11] Patent Number: 5,196,492
[45] Date of Patent: Mar. 23, 1993

[54] POLYMERIZABLE COMPOSITION COMPRISING POLY(ALLYL CARBONATE) OF POLYHYDROXY COMPOUND AND POLYHYDROXY COMPOUND

[75] Inventors: Fiorenzo Renzi, Gorgonzola; Claudio Gagliardi, San Donato Milanese; Franco Rivetti, Milan, all of Italy

[73] Assignee: Enichem Synthesis S.p.A., Palermo, Italy

[21] Appl. No.: 750,603

[22] Filed: Aug. 27, 1991

[30] Foreign Application Priority Data

Aug. 29, 1990 [IT]  Italy ................. 21327 A/90

[51] Int. Cl.$^5$ ............................................ C08F 18/24
[52] U.S. Cl. .................................. 526/210; 526/261; 526/310; 526/314; 526/318; 528/271; 528/392
[58] Field of Search ............... 526/210, 261, 314, 318, 526/310; 528/392, 271

[56] References Cited

U.S. PATENT DOCUMENTS 4,396,737  8/1983  Leatherman .................. 526/210

Primary Examiner—Harold D. Anderson
Attorney, Agent, or Firm—Oblon, Spivak, McClelland, Maier & Neustadt

[57] ABSTRACT

A liquid composition which can undergo radical polymerization to produce an almost colorless and easily dyeable organic glass, containing (i) at least one poly(allyl carbonate) of a polyhydroxy alcohol having from 2 to 20 carbon atoms and from 2 to 6 hydroxy groups in the molecule, and (ii) at least one aliphatic polyol having from 2 to 5 hydroxy groups in the molecule, in quantities from 0.01 to 1% by weight on the whole composition.

9 Claims, No Drawings

POLYMERIZABLE COMPOSITION COMPRISING POLY(ALLYL CARBONATE) OF POLYHYDROXY COMPOUND AND POLYHYDROXY COMPOUND

The present invention concerns a liquid composition which can polymerize into organic glass initially almost colourless and with good dyeability using conventional dyes.

Organic glass made up of the products of the radical polymerization of poly(allyl carbonates) of polyols, used for optical equipment, as, for example, described by F. Strain; "Encyclopedia of Chemical Processing and Design", Vol.1, Interscience Publishers, New York, 1964, pages 799 onwards, is already known in the art.

In the field of polymers for organic glass, especially that used for ophthalmic lenses, it is necessary to use materials either totally, or almost totally colourless and easily dyeable in the usual shades of lenses.

In this respect, organic glass produced according to the known techniques has various deficiencies mainly due to the excessive degree of colouring (generally yellow) which it acquires during the polymerization stage of the relative monomers, caused by the organic peroxides used as catalysts.

Another effect caused by peroxides, which occurs in the production of manufactures coloured by the mass addition technique, consists of a change in the colouring of most of the well-known dyes. To avoid this, colouration is carried out almost exclusively by means of surface impregnation, by immersing the manufactures in water dispersions of the dyes. However, unlike mass addition, colouration by means of impregnation is hindered by the large amounts of time required.

It has now been discovered that the disadvantages of the known technique can be overcome by adding a small quantity of a free aliphatic polyol to the liquid compositions to be polymerized, made up of or containing at least one bis(allyl carbonate) of diethylene glycol or at least one poly(allyl carbonate)of a di- or polyhydroxy alcohol. More specifically, it has been discovered that the presence of a free aliphatic polyol in the radical polymerization stage not only notably reduces the colouring of the polymerized products but also makes them easily dyeable by means of surface impregnation, with considerable reductions in the dyeing times. Finally, it has also been discovered that the addition of a free aliphatic polyol does not interfere in any way with the other characteristics of the polymerized products, particularly its thermal and mechanical properties.

On this basis, the present invention concerns a liquid composition which can undergo radical polymerization to produce an almost colourless and easily dyeable organic glass, containing (i) at least one poly(allyl carbonate) of a polyhydroxy alcohol having from 2 to 20 carbon atoms and from 2 to 6 hydroxy groups in the molecule, and (ii) at least one aliphatic polyol having from 2 to 5 hydroxy groups in the molecule, in quantities ranging from 0.01 to 1% by weight of the composition.

Preferably, the aliphatic polyol (component (ii)) of the composition, subject of the present invention, should be a liquid aliphatic polyol under normal conditions and soluble in the composition to be polymerized. It is preferable for it to be chosen from one of the following: ethylene glycol, diethylene glycol, triethylene glycol, neopentyl glycol, butanediol, hexanediol, trimethylol propane, glycerine and pentaerythritol. Of these, the best results are obtained with ethylene glycol. The preferred quantity of aliphatic polyol (ii) present in the composition to be polymerized, ranges from 0.05 to 0.5% by weight.

The poly(allyl carbonate)of the polyhydroxy alcohol (component (i)) of the composition according to the present invention, should be chosen from poly(allyl carbonates) of polyhydroxy alcohols generally containing from 2 to 20 carbon atoms and from 2 to 6 hydroxy groups in the molecule. Examples of these alcohols are: ethylene glycol, diethylene glycol, triethylene glycol, tetraethylene glycol, 1,3-propylene glycol, 1,4-butanediol, 1,6-hexanediol, neopentyl glycol, 2,2,4-trimethyl-1,3-pentanediol, 1,4-dimethanol cyclohexane, 4,8-bis(hydroxy ethyl)tricycle(5,2,1,0,$^{2,6}$)decane, alfa,alfa'-xylendiol, 1,4-bis(hydroxyethyl)toluene,2,2-bis(4-(hydroxyethyl)phenyl) propane, pentaerythritol, trimethylol propane, dipentaerythritol, ditrimethylolpropane, tris(hydroxyethyl isocyanurate).

These polyallyl carbonates (i) can be in the form of either monomers or oligomers. The poly(allyl carbonate) monomers are usually obtained by using chloroformates. In this way, bis(allyl carbonate) of diethylene glycol can be obtained by reacting bis(chloroformiate) of diethylene glycol with allyl alcohol in the presence of an alkali, as described in Kirk-Othmer, "Encyclopedia of Chemical Technology", 3rd Ed., volume 2, page 111. The poly(allyl carbonates) (i) ca be suitably obtained by means of transesterification reactions between diallyl carbonate and the polyhydroxy alcohol chosen, as described in European patent No.35.304. In this way, poly(allyl carbonate) monomers or mixtures of monomers and oligomers can be obtained, depending on the ratio between the diallyl carbonate reagents and polyhydroxy alcohol. By means of a transesterification reaction, it is also possible to obtain mixed poly(allyl carbonates) by reacting diallyl carbonate with a mixture of polyhydroxy alcohols. These mixed poly(allyl carbonates) are also taken into consideration in the present invention.

The preferred poly(allyl carbonates) (i) for the purposes of this invention are those of the following polyhydroxy alcohols: diethylene glycol, 4.8-bis(hydroxy ethyl)tricycle 5.2.0.$^{2,6}$) decane, 1.4-dimethanol cyclohexane, pentaerythritol and tris(hydroxy ethyl) isocyanurate.

In compliance with this, specific examples of poly(allyl carbonates of polyhydroxy alcohols (i) suitable for the purposes of the present invention are:

bis(allyl carbonates) of diethylene glycol obtained by the transesterification of diallyl carbonate with diethylene glycol, in a molar ratio ranging from approx. 20/1 to approx. 2/1, and containing a quantity of bis(allyl carbonate of diethylene glycol monomer which, depending on the ratio between the reagents, generally ranges from 93 to approx. 34% by weight, the remaining percentage basically consisting of oligomers; as, for example, described in European patent No. 35.304 mentioned above;

bis (allyl carbonates), both monomer and oligomers, of bis(hydroxy-methyl)tricyclo decane, prepared by the transesterification of diallyl carbonate with bis(hydroxy-methyl)tricyclo decane, with a molar ratio of the first as respect the second from approx. 18/1 to approx. 2/1; as, for example, described in European patent application No. 321.057;

bis(allyl carbonates), both monomer and oligomers, of 1,4-dimethanol cyclohexane, prepared by the transesterification of diallyl carbonate with 1,4-dimethanol cyclohexane, with a molar ratio of the first as respect the second from approx. 18/1 to approx. 2/1, as described in European patent application No. 321.057 mentioned above;

mixed poly(allyl carbonates), both monomers and oligomers, obtained by the transesterification of diallyl carbonate with a mixture of pentaerythritol and diethylene glycol, with a molar ratio between the diallyl carbonate and the total amount of pentaerythritol and diethylene glycol ranging from approx. 3/1 to approx. 12/1, as, for example, described in European patent application No. 302.537;

mixed poly(allyl carbonates), both monomers and oligomers, obtained by the transesterification of diallyl carbonate and a mixture of tris(hydroxy-ethyl) isocyanate and diethylene glycol, with a molar ratio between the diallyl carbonate and the total amount of tris(hydroxyethyl)isocyanate and diethylene glycol ranging from approx. 3/1 to approx. 12/1, as, for example, described in European patent application No. 302.537 mentioned above;

liquid compositions containing 10–15% by weight of bis(allyl carbonate) of diethylene glycol monomer, 20–70% by weight of bis(allyl carbonate) of diethylene glycol oligomer and 5–50% by weight of tris(allyl carbonate) of tri(hydroxy-ethyl isocyanate monomer, as described in European patent application No.201.978.

The compositions which can polymerize, subject of the present invention, may contain a further component (iii) composed of one or more acrylic, vinylic or allylic monomers (different from allyl carbonates), which can copolymerize with poly(allyl carbonate) of polyhydroxy alcohol (i) in quantities from 0 to 50% by weight of the composition, normally from 0 to 25% by weight. Examples of these monomers are: methyl acrylate, methyl methacrylate, phenyl methacrylate, vinyl acetate, vinyl benzoate, diallyl phthalate, diallyl adipate and triallyl cyanurate.

The composition of the present invention also contains a polymerization initiator in quantities ranging from 2 to 8 parts by weight for every 100 parts by weight of the composition. This initiator should be soluble in the composition and capable of producing free radicals at a temperature which ranges from 30° to approx. 100° C. Some non limitative examples of such initiators are organic peroxide and percarbonate initiators especially diisopropyl peroxy dicarbonate, dicyclohexyl peroxy dicarbonate, di-sec-butyl peroxy dicarbonate, dibenzoyl peroxide and ter-butyl perbenzoate. For the purposes of the present invention, it is preferable for the polymerization initiator to be present in the composition in quantities from 3 to 6 parts by weight for every 100 parts by weight of such composition.

The liquid composition which can polymerize, subject of the present invention, may also contain one or more conventional additive to act as ultraviolet light stabilizers, detaching agents, dyes, pigments, infrared light absorbers etc., in quantities however not higher than 1 part by weight every 100 parts by weight of the composition.

The liquid composition which can polymerize, subject of the present invention, is transformed into optical items by means of casting polymerization. The polymerization process is initiated by the free radicals produced by the decomposition of the polymerization initiators added to the composition, at a working temperature which generally ranges from 35 to 100° C. In these conditions, the time necessary for complete polymerization ranges from 2 to 100 hours.

By adding small quantities of an aliphatic polyol (component (ii)) to the compositions described in the present invention, polymerized products are obtained with a considerably reduced initial colouring and easily dyeable with normal dyes, without interfering with the other characteristics, especially the thermal and mechanical properties, as can be seen from the experimental examples which follow and which are intended to give a better illustration of the present invention.

In said examples, liquid compositions which can polymerize are prepared, the polymerization initiator dicyclohexyl peroxy dicarbonate is added and the resulting compositions are polymerized in glass moulds equipped with a flexible coat of plastified vinyl chloride resin, which determines the thickness of the polymer manufacture. Polymerization occurs in an oven with forced air circulation, with a polymerization cycle of 20 hours and at a temperature which rises from 40° to 80° C.

The following characteristics are determined on the hard samples:

Refraction index $n_D^{20}$), measured with an Abbe refractometer (ASTM D-542);

Haze (%) and Transmittance (visible range), measured with a Gardner Hazegard XL-211 (ASTM-1003);

Yellow Index (YI) defined as: $YI=(100/Y)$ $(1.277X - 1.06Z)$, measured with a Gardner colorimeter XL-805 (ASTM D-1925);

Rockwell Hardness (M), measured with a Rockwell durometer (ASTM D-785);

Dyeability, expressed as a % of light transmittance (ASTM D-1003) of the test sample after immersion in a dye bath at 98° C. made up of a water dispersion of BPI GREY of BRAIN POWER.

In addition, the following poly(allyl carbonates) of polyhydroxy alcohols (component (i)) are used in the experimental examples which follow: A) bis(allyl carbonate) of diethylene glycol, prepared by reacting diallyl carbonate with diethylene glycol, with a molar ratio of 12/1, containing approx. 88% by weight of monomer and 12% by weight of oligomers; a liquid product having a density of 1.15 g/ml and viscosity of 14 cts at 25° C.;

B) bis(allyl carbonate) of bis(hydroxy-methyl) tricyclo bis(hydroxy-methyl) tricyclo decane, with a molar ratio of 12/1; a liquid product having a density of 1.14 g/ml and viscosity of 195 cts at 25° C.;

C) bis(allyl carbonate) of 1,4-dimethanol cyclohexane, prepared by reacting diallyl carbonate with 1.4-dimethanol cyclohexane, with a molar ratio of 12/1; a liquid product having a density of 1.099 g/ml and viscosity of 43.4 cts at 25° C.;

D) product of the reaction between diallyl carbonate and a mixture containing 25% of pentaerythritol and 75% by weight of diethylene glycol, with a molar ratio between the diallyl carbonate and the total amount of pentaerythritol and diethylene glycol of 5/1; a liquid product having a density of 1.183 g/ml and viscosity of 53.5 cts at 25° C.;

E) product of the reaction between diallyl carbonate and a mixture containing 30% by weight of tris(hydroxy-ethyl) isocyanate and 70% by weight of diethylene glycol, with a molar ratio between the diallyl carbonate and the total amount of tris(hydroxy- ethyl) isocyanate and diethylene glycol of 4/1; a liquid product having a density of 1.210 g/ml and viscosity of 79.1 cts at 25° C.;

F) liquid composition made up of 37 parts by weight of bis(allyl carbonate) of diethylene glycol monomer, 37 parts by weight of bis(allyl carbonate) of diethylene glycol oligomer and 26 parts by weight of tris(allyl carbonate) of tri(hydroxy-ethyl) isocyanate monomer; a liquid product having a density of 1.209 g/ml and viscosity of 81 cts at 25° C.

EXAMPLE 1

Compositions which can polymerize, containing component A, MEG (ethylene glycol) and DCPD (dicyclohexylperoxydicarbonate), are prepared in the percentages by weight shown in Table I below.

TABLE I

| Composition No. | 1 | 2 | 3 |
|---|---|---|---|
| Component A (%) | 94.9 | 94.7 | 95 |
| MEG (%) | 0.1 | 0.3 | — |
| DCPD (%) | 5 | 5 | 5 |

These compositions are transformed by polymerization into 5 mm thick flat sheets, working under the conditions indicated in the description. The characteristics of these sheets are shown in Table II below. Composition No. 3, without MEG, is used as a comparison.

TABLE II

| Composition No. | 1 | 2 | 3 |
|---|---|---|---|
| YI | 1.29 | 0.88 | 1.86 |
| Haze, % | 0.18 | 0.20 | 0.17 |
| Transmittance, % | 92.6 | 92.7 | 92.5 |
| Rockwell Hardness (M) | 97 | 95 | 97 |
| % Transmittance (3', 98° C., BPI GREY) | 26.2 | 22.0 | 34.2 |

EXAMPLE 2

Operation in the same way as in Example 1, liquid composition which can polymerize and which are shown in Table III, are prepared and transformed into sheets whose characteristics are shown in Table IV. Compositions 6 and 9, without MEG, are used as a composition.

TABLE III

| Composition No. | 4 | 5 | 6 | 7 | 8 | 9 |
|---|---|---|---|---|---|---|
| Component B (%) | 94.9 | 94.7 | 95 | — | — | — |
| Component C (%) | — | — | — | 94.9 | 94.7 | 95 |
| MEG (%) | 0.1 | 0.3 | — | 0.1 | 0.3 | — |
| DCPD (%) | 5 | 5 | 5 | 5 | 5 | 5 |

TABLE IV

| Composition No. | 4 | 5 | 6 | 7 | 8 | 9 |
|---|---|---|---|---|---|---|
| YI | 5.04 | 3.27 | 6.98 | 2.54 | 1.76 | 4.65 |
| Haze, % | 0.22 | 0.19 | 0.20 | 0.25 | 0.20 | 0.23 |
| Transmittance % | 91.5 | 91.9 | 90.9 | 92.2 | 92.5 | 91.7 |
| Rockwell Hardness (M) | 113 | 110 | 114 | 119 | 118 | 120 |
| % Transmittance (15', 98° C., BPI GREY) | 57.4 | 47.3 | 68.6 | 69.1 | 61.7 | 74.5 |

EXAMPLE 3

Operating in the same way as in Example 1, compositions which can polymerize and which are shown in Table V are prepared and transformed into sheets whose characterized are shown in Table VI. Composition 13, without MEG, is used as a composition.

TABLE V

| Composition No. | 10 | 11 | 12 | 13 |
|---|---|---|---|---|
| Component D (%) | 94.9 | 94.7 | 94.5 | 95 |
| MEG (%) | 0.1 | 0.3 | 0.5 | — |
| DCPD (%) | 5 | 5 | 5 | 5 |

TABLE VI

| Composition No. | 10 | 11 | 12 | 13 |
|---|---|---|---|---|
| YI | 3.20 | 2.47 | 2.10 | 5.05 |
| Haze, % | 0.26 | 0.26 | 0.30 | 0.28 |
| Transmittance, % | 92.2 | 92.5 | 92.7 | 91.6 |
| Rockwell Hardness (M) | 111 | 109 | 106 | 112 |
| % Transmittance (15', 98° C., BPI GREY) | 46.5 | 41.5 | 39.0 | 54.3 |

EXAMPLE 4

Operating in the same way as in Example 1, compositions which can polymerize and which are shown in Table VII are prepared and transformed into sheets whose characteristics are shown in Table VIII. Compositions 17 and 21, without MEG, are used as a comparison.

TABLE VII

| Composition No. | 14 | 15 | 16 | 17 | 18 | 19 | 20 | 21 |
|---|---|---|---|---|---|---|---|---|
| Component E (%) | 94.9 | 94.7 | 94.5 | 95 | — | — | — | — |
| Component F (%) | — | — | — | — | 94.9 | 94.7 | 94.5 | 95 |
| MEG (%) | 0.1 | 0.3 | 0.5 | — | 0.1 | 0.3 | 0.5 | — |
| DCPD (%) | 5 | 5 | 5 | 5 | 5 | 5 | 5 | 5 |

TABLE VIII

| Composition No. | 14 | 15 | 16 | 17 | 18 | 19 | 20 | 21 |
|---|---|---|---|---|---|---|---|---|
| YI | 1.45 | 1.19 | 0.90 | 2.36 | 1.20 | 0.95 | 0.91 | 2.08 |
| Haze, % | 0.28 | 0.20 | 0.21 | 0.23 | 0.19 | 0.28 | 0.23 | 0.19 |
| Transmittance % | 92.5 | 92.6 | 92.7 | 92.3 | 92.7 | 92.7 | 92.7 | 92.1 |
| Rockwell Hardn. (M) | 104 | 103 | 99 | 104 | 103 | 100 | 97 | 103 |
| % Transmittance (15', 98° C., BPI GREY) | 34.8 | 26.5 | 22.8 | 41.8 | 25.0 | 21.5 | 18.7 | 28.4 |

We claim:

1. Liquid composition which can undergo radical polymerization to produce an almost colourless and easily dyeable organic glass, containing (i) at least one poly(allyl carbonate) composition of a polyhydroxy alcohol having from 2 to 20 carbon atoms and from 2 to 6 hydroxy groups in the molecule, (ii) at least on aliphatic polyol having from 2 to 6 hydroxy groups in the molecule in quantities ranging from 0.01 to 1% by weight based on the weight of the composition, and (iii) a component composed of one or more acrylic, vinylic or allylic monomers, different from allyl carbonates, copolymerizable copolymerized with poly(allyl carbonate) of polyhydroxy alcohol in quantities from 25% to 50% by weight based on the composition, selected from the group consisting of methyl acrylate, methyl methacrylate, phenyl methacrylate, vinyl acetate, vinyl benzoate, diallyl phthalate, diallyl adipate and triallyl cyanate, said poly(allyl carbonate) composition (i) being selected from the group consisting of:

bis(allyl carbonates) of diethylene glycol obtained by the transesterification of diallyl carbonate with ethylene glycol, in a molar ratio ranging from approximately 20/1 to approximately 2/1, and containing a quantity of bis(allyl carbonate) of diethylene glycol monomer which ranges from approximately 93 to approximately 34% by weight, the remaining percentage consisting of oligomers;

bis(allyl carbonates), both monomer and oligomers, of bis(hydroxy methyl)tricyclo decane prepared by the transesterification of diallyl carbonate with bis(hydroxy methyl)tricyclo decane, in a molar a ratio ranging from approximately 18/1 to approximately 2/1;

bis(allyl carbonates), both monomer and oligomers, of 1,4-dimethanol cyclohexane, prepared by the transesterification of diallyl carbonate with 1,4-dimethanol cyclohexane, in a molar ratio ranging from approximately 10/1 to approximately 2/1;

mixed poly(allyl carbonates), both monomers and oligomers, obtained by the transesterification of diallyl carbonate with a mixture of pentaerythritol and diethylene glycol, with a molar ration between the diallyl carbonate and the total amount of pentaerythritol and diethylene glycol ranging from approximately 3/1 to 12/1;

mixed poly(allyl carbonates), both monomers and oligomers, obtained by the transesterification of diallyl carbonate with a mixture of tris(hydroxy ethyl)isocyanate and diethylene glycol, with a molar ratio between the diallyl carbonate and the total amount of tris(hydroxy ethyl)isocyanate and diethylene glycol ranging from approximately 3/1 to approximately 12/1; and liquid compositions containing 10–50% by weight of bis(allyl carbonate) of diethylene glycol monomer, 20–70% by weight of bis(allyl carbonate) of diethylene glycol oligomer and 5–50% by weight of tris(allyl carbonate) of tri(hydroxy ethyl)isocyanurate monomer.

2. Composition according to claim 1, wherein polyol (ii) is selected from the group consisting of ethylene glycol, diethylene glycol, triethylene glycol, neopentylic glycol, butanediol, hexanediol, trimethylol propane, glycerine and pentaerythritol.

3. Composition according to claim 1, wherein polyol (ii) is ethylene glycol.

4. Composition according to claim 1, wherein the quantity of aliphatic polyol (ii) present in the composition which can polymerize, ranges from 0.05 to 0.5% by weight.

5. Composition according to claim 1, wherein poly(allyl carbonate) composition (i) is a poly(allyl carbonate) monomer or oligomer of a polyhydroxy alcohol selected from the group consisting of ethylene glycol, diethylene glycol, triethylene glycol, tetraethylene glycol, 1,3-propylene glycol, 1,4-butanediol, 1,6-hexanediol, neopentylic glycol, 2,2,4-trimethyl-1,3-pentanediol, 1,4-dimethanol cyclohexane, 4,8-bis(hydroxy ethyl)tricyclo(5.2.1.0$^{2,6}$)decane, $\alpha,\alpha'$-xyleneidol, 1,4-bis(hydroxy ethyl)toluene, 2,2-bis(hydroxy ethyl)phenyl)propane, pentaerythritol, trimethylol propane, dipentaerythritol, ditrimethylolpropane, and tris(hydroxy ethyl isocyanurate).

6. Composition according to claim 1, wherein the composition additionally contains from 2 to 8 parts by weight, for every 100 parts by weight of the composition, of a polymerization initiator which is soluble in the composition and capable of producing free radicals at a temperature which ranges from approximately 30° to approximately 100° C.

7. Composition according to claim 1, wherein the initiator is selected from the group consisting of diisopropyl peroxy dicarbonate, dicyclohexyl peroxy dicarbonate, di-sec-butyl peroxy dicarbonate, dibenzoyl peroxide and ter-butyl perbenzoate, and is present in quantities ranging from 3 to 6 parts by weight for every 100 parts by weight of the total amount of components (A) and (B).

8. Composition according to claim 1, wherein the composition also contains one or more additives selected from the group consisting of detaching agents, dyes, pigments and infra-red light absorbants, in a total quantity which does not exceed 1 part by weight for every 100 parts by weight of the composition.

9. Organic glass obtained by casting polymerization of the composition according to any one of claims 1 to 5 or 6 to 8.

* * * * *